United States Patent
Takagishi et al.

(10) Patent No.: US 6,287,662 B1
(45) Date of Patent: Sep. 11, 2001

(54) OPTICAL DATA RECORDING MEDIUM

(75) Inventors: Yoshikazu Takagishi; Takanobu Matsumoto; Yuaki Shin; Emiko Hamada, all of Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 09/099,361

(22) Filed: Jun. 18, 1998

(30) Foreign Application Priority Data

Jun. 19, 1997 (JP) .................................... 9-177807
Apr. 23, 1998 (JP) .................................. 10-128101

(51) Int. Cl.⁷ .................. B32B 27/06; B32B 27/18; G03B 7/24
(52) U.S. Cl. .................. 428/64.9; 428/64.2; 428/64.4; 428/64.7; 428/64.8; 428/65.1; 264/1.33; 430/270.11; 430/270.14; 430/270.2; 430/270.21; 369/13
(58) Field of Search .................. 428/64.1, 64.2, 428/64.4, 64.7, 64.8, 64.9, 65.1, 694 ML; 430/270.11, 270.14, 270.2, 270.21; 264/1.33; 369/13

(56) References Cited

U.S. PATENT DOCUMENTS

| | | | |
|---|---|---|---|
| 4,656,121 | * | 4/1987 | Sato et al. ............................ 430/495 |
| 5,079,135 | * | 1/1992 | Matsuzawa et al. .................. 430/495 |
| 5,155,009 | * | 10/1992 | Yanagisawa et al. ................. 430/270 |
| 5,182,186 | * | 1/1993 | Inagaki et al. ........................ 430/270 |
| 5,660,970 | * | 8/1997 | Shimizu et al. ................ 430/270.21 |
| 5,776,575 | * | 7/1998 | Hiraoka et al. ...................... 428/64.1 |
| 5,817,389 | * | 10/1998 | Ono ...................................... 428/64.1 |

FOREIGN PATENT DOCUMENTS 4-192131  7/1992 (JP) .
7-105065  11/1995 (JP) .

* cited by examiner

Primary Examiner—Vivian Chen
(74) Attorney, Agent, or Firm—Ostrolenk, Faber, Gerb & Soffen, LLP

(57) ABSTRACT

An optical data recording medium in which the shape of the dye spectrum of a dye film having a thin film thickness per unit absorbance is controlled so as to enable improvements in the recording speed during high speed recording, jitter, and modulation, wherein the optical data recording medium is characterized in that $0 < D/C \leq 100$, and $80 \leq D/B$, where D (nm) is the mean film thickness of the light-absorbing layer, C (Abs) is the maximum absorbance (based on molecular absorption) of the light-absorbing substance, B (Abs) is the maximum absorbance (based on association absorption) of the light-absorbing substance, D/C is the unit absorbance thickness based on the molecular absorption, and D/B is the unit absorbance thickness based on the association absorption.

8 Claims, 9 Drawing Sheets

Y= −CH3, −Cl, −Br, —⟨cyclohexyl⟩, −H etc.

X⁻= ClO4⁻, BF4⁻, PF6⁻, SbF6⁻, CF3COO⁻,
    Cl⁻, Br⁻, I⁻, F⁻, etc.

OPTICAL DATA RECORDING MEDIUM

BACKGROUND OF THE INVENTION

1. Field of the Invention

The present invention relates to an aqueous dispersion recording medium, and more particularly to a writable optical data recording medium having at least a light-absorbing layer and a light-reflecting layer on a light-transmitting substrate.

2. Description of Related Art

Conventional writable optical data recording media are essentially structures in which a light-absorbing layer consisting of an organic dye or the like is located on a light-transmitting substrate having spirally formed pregrooves, and a light-reflecting layer consisting of a metal film or the like is located on the light-absorbing layer, as described in Japanese Patent Publication 7-105065, for example.

Data is recorded when laser-based recording light is directed onto the optical data recording medium from the substrate side so as to allow the energy to be absorbed by the light-absorbing layer, and recording pits are formed as a result of the heating and decomposition of the dye in the light-absorbing layer, thermal deformation of the substrate, and so forth.

Such writable optical data recording media are generally known as "CD-Rs." Such CD-Rs characteristically are capable of only a single recording, which cannot be erased, and are highly compatible with read-only CDs (compact discs) and CD-ROMs, making them quite popular, particularly in the data processing fields.

The growth of data as well as the increasing sophistication and complexity of data processing have led to more rapid recording on optical data recording media and more rapid read-out in the last several years. 6× recording devices and 15× read-out CD-ROM drives became commercially available by the end of 1996 in the CD-R market.

Efforts have been made to obtain an optical data recording medium in which the recording speed is 6 times faster, assuming, for example, 6× high speed recording, where the medium is irradiated with high output laser light in time increments that are about ⅙ the time corresponding to the pit length nT of the EFM signal, resulting in the recording of signals within a stipulated range of pit lengths 3T to 11T.

Accordingly, precision greater than that of conventional equal-speed recording is needed in order to control the T recording pit length of recording devices.

Since it is also necessary to form pits of a prescribed length in a fraction of the conventional time on recording media, the effects of heat and thermal interference during recording are far greater than in the past.

Thermal irregularities produced during such high speed recording thus result in worse jitter, causing deviation in pit length.

In Japanese Laid-Open Patent Application 4-192131, for example, dyes such as benzoindodicarbocyanin and indodicarbocyanin are mixed as the light-absorbing substance in the light-absorbing layer.

That is, the benzoindodicarbocyanin is added as a light-absorbing agent, and the indodicarbocyanin is added as an agent to increase the reflectivity. The benzoindodicarbocyanin absorbs the recording light and thus decomposes, but the indocarbocyanin does not absorb the recording light and is thus not decomposed. Sufficient modulation thus cannot be achieved or the jitter deteriorates when the light-absorbing layer has a film thickness of less than 100 nm. In other words, these problems come about when there is a lower proportion of molecules absorbing laser light in the film.

These problems occur when two or more dyes are mixed as the light-absorbing substance and also when just one dye is used, and are the effects of molecular and association absorption in the absorbance spectra described below.

SUMMARY OF THE INVENTION

With the foregoing in view, an object of the present invention is to provide an optical data recording medium in which the shape of the dye spectrum is controlled so as to enable improvements in the recording speed during high speed recording, jitter, and modulation.

Another object of the present invention is to provide an optical data recording medium that has a dye film with a thin film thickness per unit absorbance (unit absorbance thickness).

Yet another object of the present invention is to provide an optical data recording medium in which the light-absorbing substance (dye) in the light-absorbing layer of the dye film has a sharp absorbance spectrum peak.

That is, in the present invention, it was noted that the recording and playback properties can be improved by making the light-absorbing layer as thin as possible, by improving the recording sensitivity using a dye (such as a benzoindocyanin dye) with less association absorption on the short wavelength side and more molecular absorption on the long wavelength side of the dye in the light-absorbing layer, and by keeping the unit absorbance thickness within a small prescribed range. The present invention is an optical data recording medium, which comprises: a light-transmitting substrate; a light-absorbing layer that is located on the substrate and that contains a light-absorbing substance constructed of a dye that absorbs laser light-based recording light; and a light-reflecting layer that is located on the light-absorbing layer and that reflects laser light, said recording light being used to irradiate said light-absorbing layer to record data, wherein the optical data recording medium is characterized in that $0 < D/C \leq 100$, and $80 \leq D/B$, where D (nm) is the mean film thickness of the light-absorbing layer, C (Abs) is the maximum absorbance (based on molecular absorption) of the light-absorbing substance, B (Abs) is the maximum absorbance (based on association absorption) of the light-absorbing substance, D/C is the unit absorbance thickness based on the molecular absorption, and D/B is the unit absorbance thickness based on the association absorption.

The lower the D/C value the better, although this value depends on the dye material, and is virtually unaffected by the structure of the recording medium.

The D/C value is $0 < D/C \leq 100$. When the value is greater than 100, the film thickness D is too great relative to the maximum absorbance C based on molecular absorption, resulting in excessive dye film thickness during the manufacture of the disk and making it impossible to achieve satisfactory modulation and jitter specifications during recording and playback.

The unit absorbance thickness D/B based on the aforementioned association absorption should be $D/B \leq 300$.

The D/B value is $80 \leq D/B$. When the value is less than 80, the absorption peak on the short wavelength side is too great relative to the film thickness D, with a corresponding decrease in the absorption peak on the long wavelength side, making it impossible to record with sufficiently low laser power because of the decrease in the absolute absorption of the dye at the recording laser wavelength at the tail of the peak on the longer wavelength side of the absorption peak on the long wavelength side.

Conversely, when the D/B value is greater than 300, there is a correspondingly excessive increase in the absorption peak on the long wavelength side, so that, in contradistinction to the reasons given above, the excessive absolute absorption of dye at the laser wavelength makes it impossible to obtain adequate reflectivity during play back and prevents satisfactory specifications from being met.

H≦180 nm is preferred, where H is the half-width at the wavelength of the maximum absorption peak of the aforementioned light-absorbing substance.

The value H is H≦180 nm. When a material with a value greater than 180 is used, recording with sufficiently low jitter is not possible.

The maximum absorbance C of the aforementioned light-absorbing substance should be 0.6≦C≦1.1.

The value C is 0.6≦C≦1.1. When the value is greater than 1.1 (Abs), the absorptivity at the laser wavelength is too great, the balance in pit length is lost during pit recording within the stipulated pit length range of 3T to 11T, it becomes difficult to record pits of the prescribed length, deformation and distortion tend to be produced, particularly with long pits, and playback signals are adversely affected. The excessive absorptivity at the laser wavelength also makes it difficult to obtain adequate reflectivity during playback.

When the maximum absorbance is less than 0.6 (Abs), it is difficult to obtain the sufficient dye film thickness needed for recording, recording with sufficiently low laser power during recording becomes difficult, and even when recording is possible, modulation within satisfactory specifications cannot be obtained during playback.

The aforementioned recording light can be absorbed at wavelengths longer than the wavelength of the maximum absorption peak of the aforementioned light-absorbing substance, and excessive absorption of the recording light can be prevented, allowing a higher reflectivity to be obtained.

Figure 3:
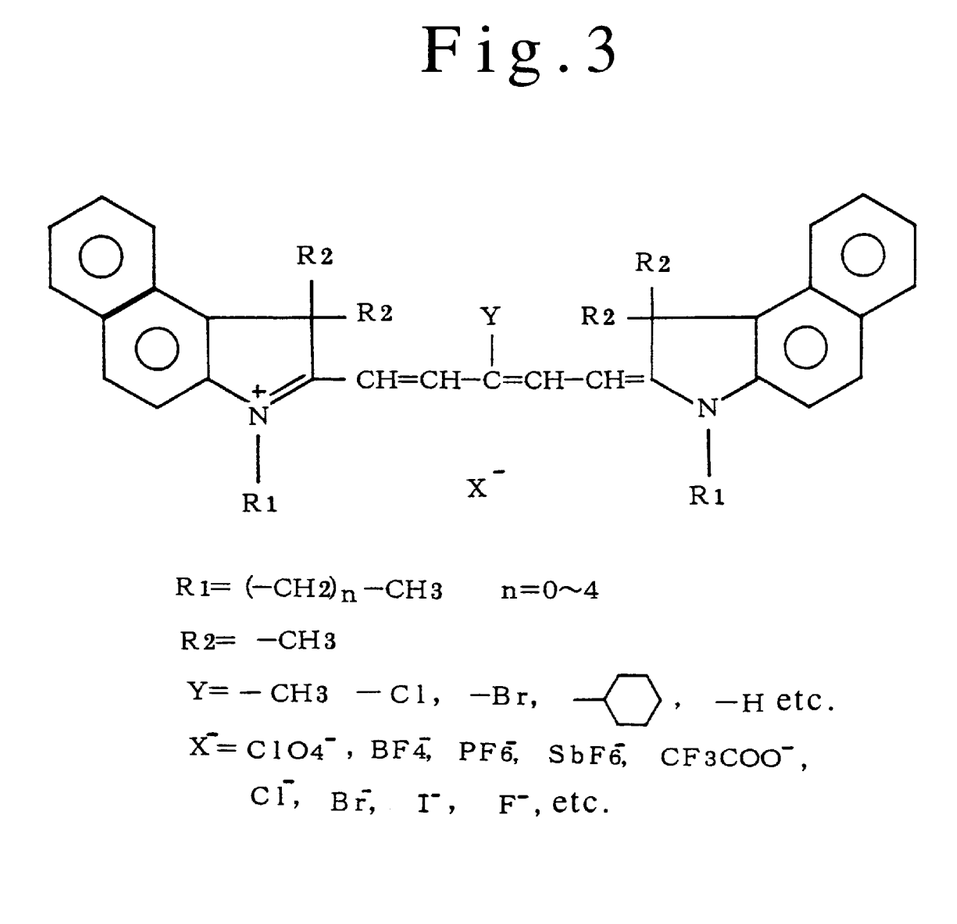
FIG. 3 shows the structural formula for the benzoindodicarbocyanin dyes which can be used as the primary light-absorbing substance.

The aforementioned light-absorbing substance can include a benzoindodicarbocyanin dye having the structural formula shown in FIG. 3.

The light-absorbing layer can contain at least 80 mol % benzoindodicarbocyanin with an absorbance film peak wavelength of at least 710 nm.

As shown in the graph in FIG. 2 below, the ratio B/C between the absorbance on the short wavelength side (that is, the absorbance based on association absorption) B (Abs) and the absorbance on the long wavelength side (that is, the absorbance based on molecular absorption) C of the two absorption peak absorbances during the formation of the film should be B/C≦1.0, and preferably 0.8≦B/C≦0.95.

D/A≦100 (nm/Abs) is preferred, where A (Abs) is the peak value of the absorbance of the aforementioned light-absorbing layer (maximum absorbance), and D (nm) is the average film thickness.

The optical data recording medium pertaining to the present invention has high recording sensitivity, and the dye in the light-absorbing layer is readily decomposed, making recording characterized by high modulation and low jitter possible with a low film thickness.

The dye characteristically has a narrow spectral peak half-width and a low long-short peak ratio.

That is, the unit absorbance film thickness of the light-absorbing layer is thinner than in the past, allowing the optical absorption properties to be improved and the post-recording reflection properties to be improved.

DESCRIPTION OF THE PREFERRED EMBODIMENTS

The present invention is described in greater detail below.

Figure 1:
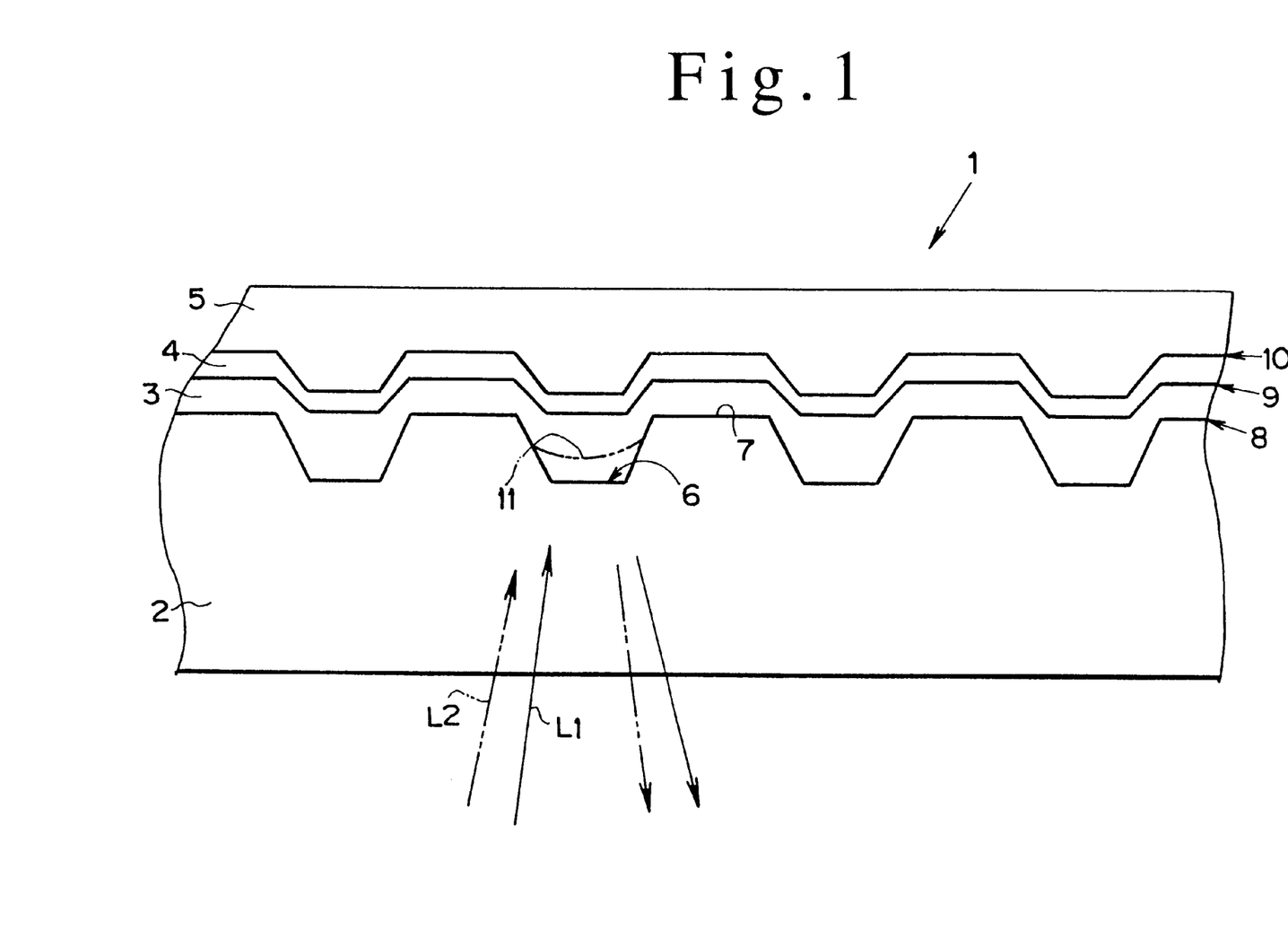
FIG. 1 is a cross section an optical data recording medium 1 in the present invention.

FIG. 1 is a cross section of the optical data recording medium 1 in the present invention, where the optical data recording medium 1 comprises a light-transmitting substrate 2, a light-absorbing layer 3 formed on the substrate 2, a light-reflecting layer 4 formed on the light-absorbing layer 3, and a protective layer 5 formed on the light-reflecting layer 4.

Spirally shaped pregrooves 6 are formed on the substrate 2. Components other than the pregrooves 6, such as land 7, are located as needed to the left and right of the pregrooves 6.

The light-absorbing layer 3 contains the primary light-absorbing substance constructed of one or more dyes that absorb laser light L1, as well as a stabilizer as needed to stabilize the primary light-absorbing substance.

The substrate 2 and the light-absorbing layer 3 are adjacent to each other at a first layer border 8. The light-absorbing layer 3 and the light-reflecting layer 4 are adjacent at a second layer border 9. The light-reflecting layer 4 and the protective layer 5 are adjacent at a third layer border 10.

As indicated in the figure, when recording light (recording laser light) L1 is used to irradiate the optical data recording medium 1, the light-absorbing layer 3 absorbs the energy of the laser light L1 and heats up, and the thermal deformation produced on the substrate 2 side results in the formation of pits 11.

Playback light (playback laser light) L2 is irradiated, and pit contrast is obtained as a result of the diffraction of light produced from the optical phase difference between the aforementioned pits 11 and non-pits (land 7), allowing the data to be read.

The primary light-absorbing substance (primary light-absorbing agent) is a substance that absorbs the laser light L1 and decomposes during recording, producing changes in the refractivity in the light-absorbing layer 3 and resulting in the formation of pits 11.

Figure 2:
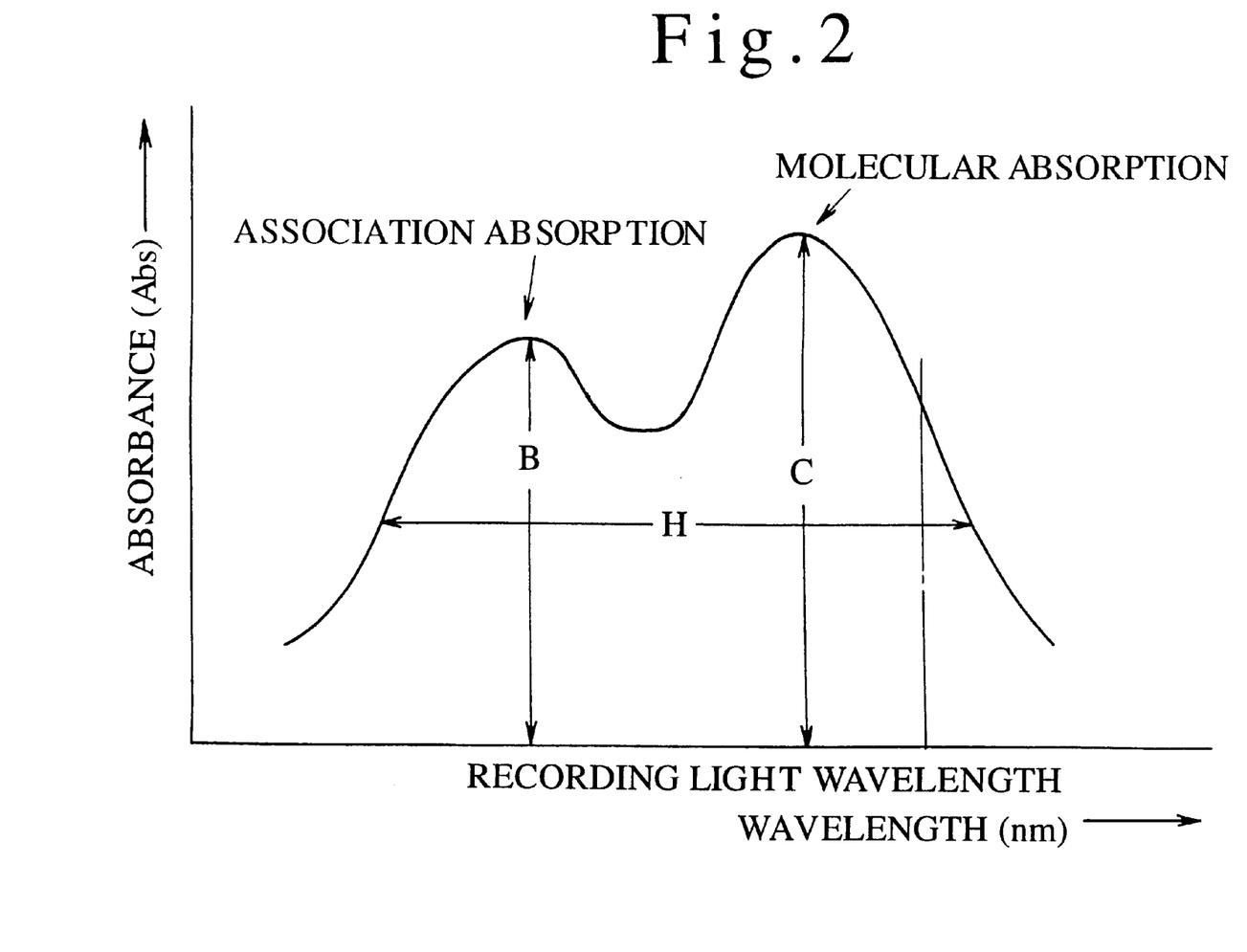
FIG. 2 is a graph of the absorbance relative to laser light wavelength.

A more detailed description is provided with reference to FIG. 2. FIG. 2 is a graph of the absorbance relative to laser light wavelength. As shown in FIG. 2, the film absorption spectra of polymethine-based and cyanin-based dye materials generally used as light-absorbing substances in recording media have two absorption peaks, even when a single compound is used.

That is, it is known that the short wavelength side absorption spectral peak (where B is the maximum absorbance) is a spectral peak significantly dependent primarily on the interaction and association action (hereinafter referred to as association absorption) between the dye molecules (one or more dyes), and that stronger association between dye molecules results in larger peaks.

It is known that the long wavelength side absorption spectral peak (where C is the maximum absorbance) is the absorption caused by the band gap energy of the dye molecules, and is the inherent absorption of the dye molecules (hereinafter referred to as molecular absorption). Recording is managed using the long wavelength side absorption of the long wavelength peak. Dye materials with a substantial long wavelength peak thus have a greater proportion of dye molecules that absorb recording laser light in the film, and materials characteristically having substantial long wavelength peaks are believed to be more sensitive to recording laser light, allowing consistent recording to be achieved.

Accordingly, dyes with a larger proportion of short wavelength peaks than long wavelength peaks, that is, dye materials with a high B/C value, have a lower proportion of dye molecules that absorb recording lasers, whereas dyes with a low B/C value have a higher proportion, so dyes with a low B/C value are believed to be capable of more sensitive and consistent recording than the aforementioned dye materials with a high B/C value.

The spectral peaks of dyes having a high B/C ratio tend to have two parallel peaks, so the shape of the spectra as a whole tends to show gently sloping spectral peaks with a broad peak width relative to peak height.

Dyes with a high long-wavelength peak ratio, on the other hand, show similar tendencies based on a single spectrum, and thus tend to show spectra of narrower peak width, with greater and sharper peak heights centered in long-wavelength peaks.

The inventors took note of this, and, as a result of extensive research, found that recording media featuring the use of dye materials with a high molecular absorption ratio, as in the case of long wavelength peaks, made it easier to achieve more sensitive recording with good modulation during printing and less deterioration in properties caused by irregularities such as jitter.

It was assumed that more efficient and stable recording involving the absorption of light, and the resulting decomposition of the dye and its heating up, was made easier when dye films which had a higher proportion of molecular absorption than association absorption were irradiated with recording light because they have a greater proportion of dye molecules that absorb recording laser light.

As indicated previously with reference to FIG. 2, $H \leq 180$ nm is possible, where H is the half-width at the maximum absorption peak wavelength of the light-absorbing substance.

It is possible to set the wavelength of the recording light to a wavelength longer than the wavelength of the maximum absorption peak (molecular absorption peak) of the light-absorbing substance to prevent the excessive absorption of the recording light by the dye so as to obtain a higher reflectivity.

FIG. 3 shows the structural formula of benzoindodicarbocyanin dyes which can be used as the primary light-absorbing substance.

The preceding description was of light-absorbing layers featuring the use of a single dye material, but the same results are obtained with light-absorbing layers obtained by mixing dyes having different absorption peaks.

That is, the inventors found that a greater proportion of dyes that did not absorb the recording laser light resulted in the same problems described above during recording and playback.

PRACTICAL EXAMPLE 1

The optical data recording medium pertaining to the present invention is described below with reference to practical examples of the present invention.

A polycarbonate substrate 2 having a thickness of 1.2 mm, an outside diameter of 120 mm, and an inside diameter of 15 mm, with spirally shaped pregrooves 6 formed at a width of 0.55 $\mu$m, a depth of 150 nm, and a pitch of 1.6 $\mu$m, was obtained by injection molding.

Figure 4:
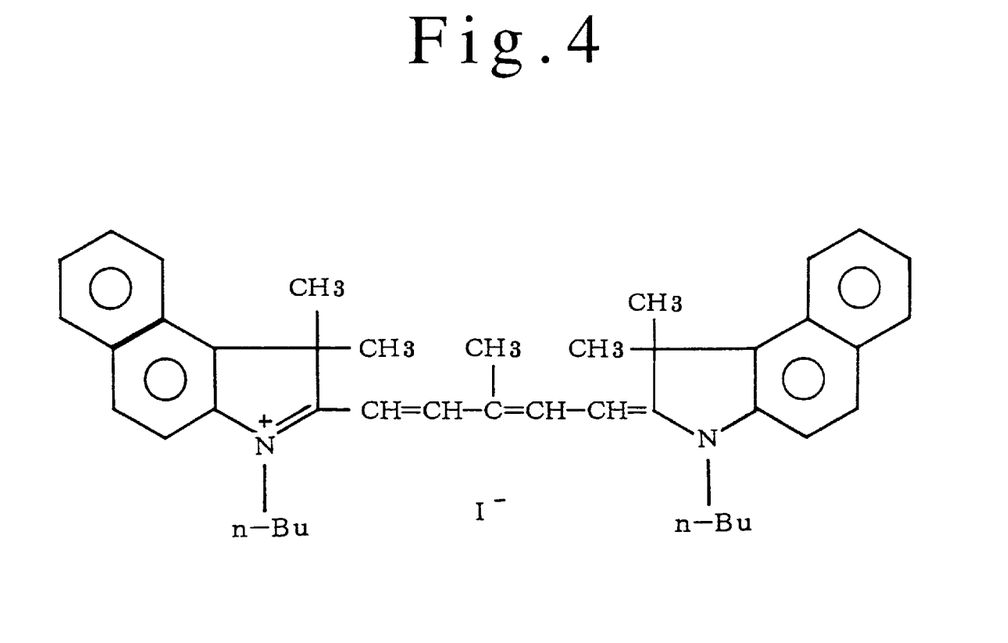
FIG. 4 shows the structural formula for a benzoindodicarbocyanin dye (NK-4000, by Nihon Kanko Shikiso Kenkyujo) which can be used as a primary light-absorbing substance.
Figure 5:
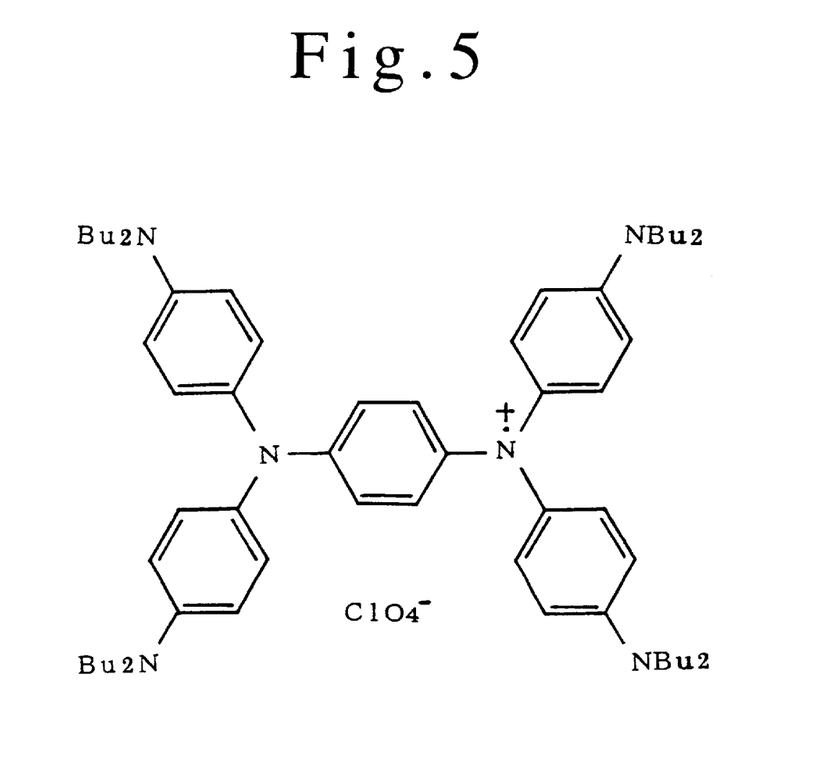
FIG. 5 shows the structural formula for aminium salt compounds used in the practical and comparative examples.

86 parts benzoindodicarbocyanin dye having the structure shown in FIG. 4 (NK-4000, by Nihon Kanko Shikiso Kenkyujo) as the recording dye and 15 weight parts aminium salt compound having the structure shown in FIG. 5 (IRG-003, by Nihon Kayaku) as a photostabilizer were dissolved using 20 g/L methyl Cellosolve, and the mixture was applied by spin coating onto the substrate 2 to form a dye film layer (light-absorbing layer 3) with a film thickness D of 69 nm.

That is, only one dye was applied to absorb the recording light.

Figure 6:
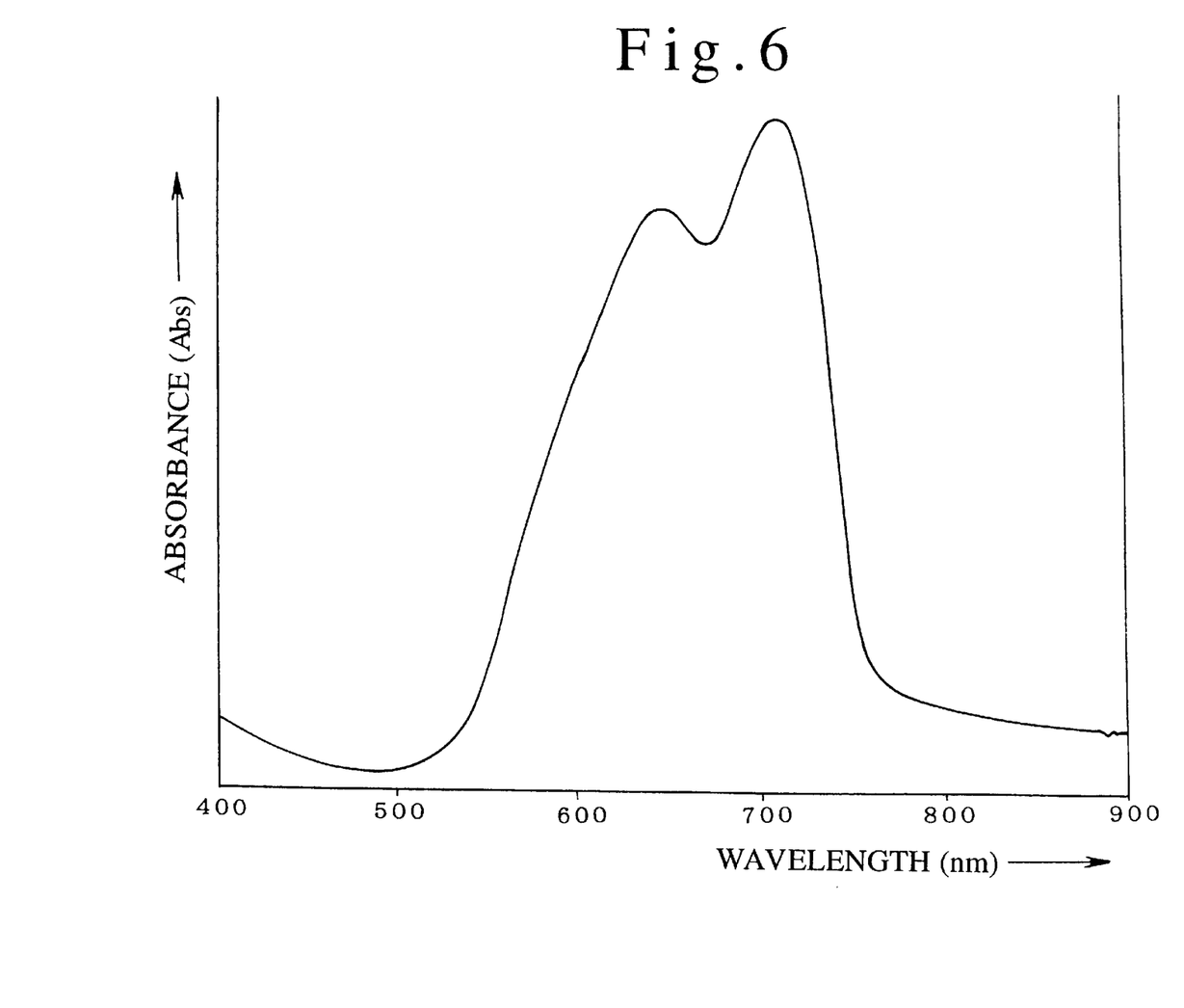
FIG. 6 is a graph of the absorbance in Practical Example 1.

Measurement of the film spectra at this time resulted in the absorption spectra given in FIG. 6.

B=0.632 Abs, and C=0.782 Abs, where B is the maximum absorbance of the short wavelength peak, and C is the maximum absorbance of the long wavelength peak.

As a result, D/B=109 nm/Abs, and D/C=88.2 nm/Abs.

Also, B/C=0.81.

The spectral wavelengths at 0.391 Abs (C/2 of the spectrum) were 601 nm and 761 nm, and the half-width H was 160 nm.

A gold (Au) light-reflecting layer 4 with a thickness of 100 nm was formed by RF sputtering on the substrate 2 with the dye film attached, an ultraviolet-curing resin (SD-211, by Dainippon Ink) was applied by spin coating on the light-reflecting layer 4, and a protective layer 5 with a thickness of 10 $\mu$m was formed by ultraviolet irradiation.

4× recording was managed at a beam speed of 4.8 m/s with a recording device (CDR-100, by Yamaha) using laser light L1 with a wavelength of 780 nm on the resulting optical data recording medium 1. The optimal recording power at this time was 12.5 mW, sufficiently lower than the maximum laser power (16 mW). The playback of the product was evaluated at a beam speed of 1.2 m/s using a commercially available CD player (Aurex, XR-R73), revealing sufficiently high modulation at 76%, and good jitter values of no more than 35 ns at both pits 11 and land 7 across the entire range of 3T to 11T.

PRACTICAL EXAMPLE 2

Figure 7:
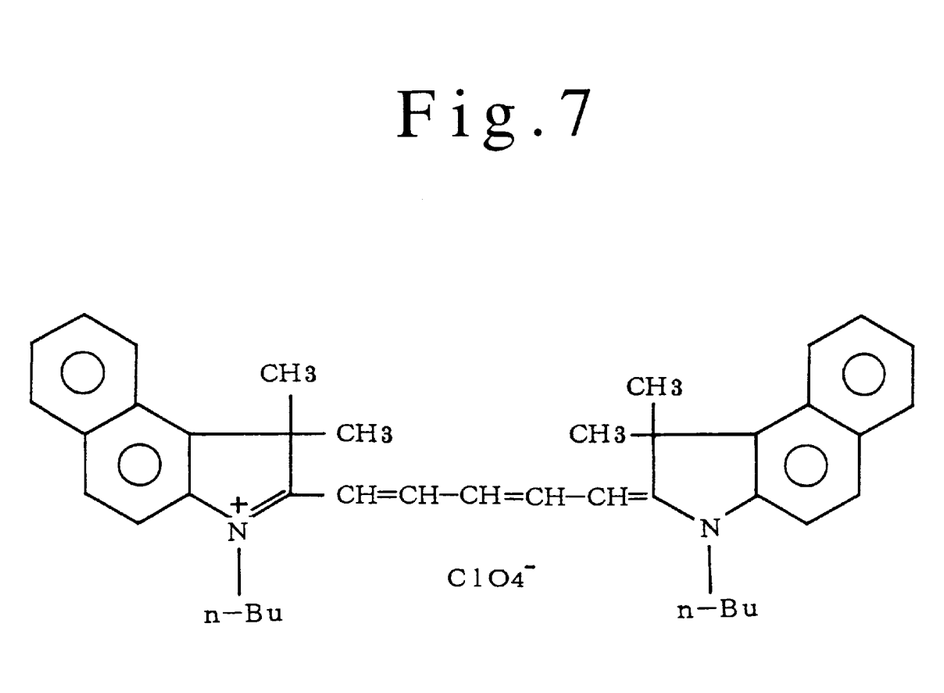
FIG. 7 shows the structural formula for the benzocyanin dye (NK-3219, by Nihon Kanko Shikiso Kenkyujo) used in Practical Example 2.

45 parts benzoindodicarbocyanin dye having the structure shown in FIG. 4 (NK-4000, by Nihon Kanko Shikiso Kenkyujo) and 40 weight parts benzoindodicarbocyanin dye (NK-3219, by Nihon Kanko Shikiso Kenkyujo) having the structure shown in FIG. 7 as the recording dye, and 15 weight parts aminium salt compound having the structure shown in FIG. 5 (IRG-003, by Nihon Kayaku) as a photostabilizer, were dissolved using 20 g/L methyl Cellosolve, and the mixture was applied by spin coating onto the polycarbonate substrate 2 obtained in Practical Example 1 to form a dye film layer (light-absorbing layer 3) with a film thickness D of 71 nm.

That is, two dyes were applied to absorb the recording light.

Figure 8:
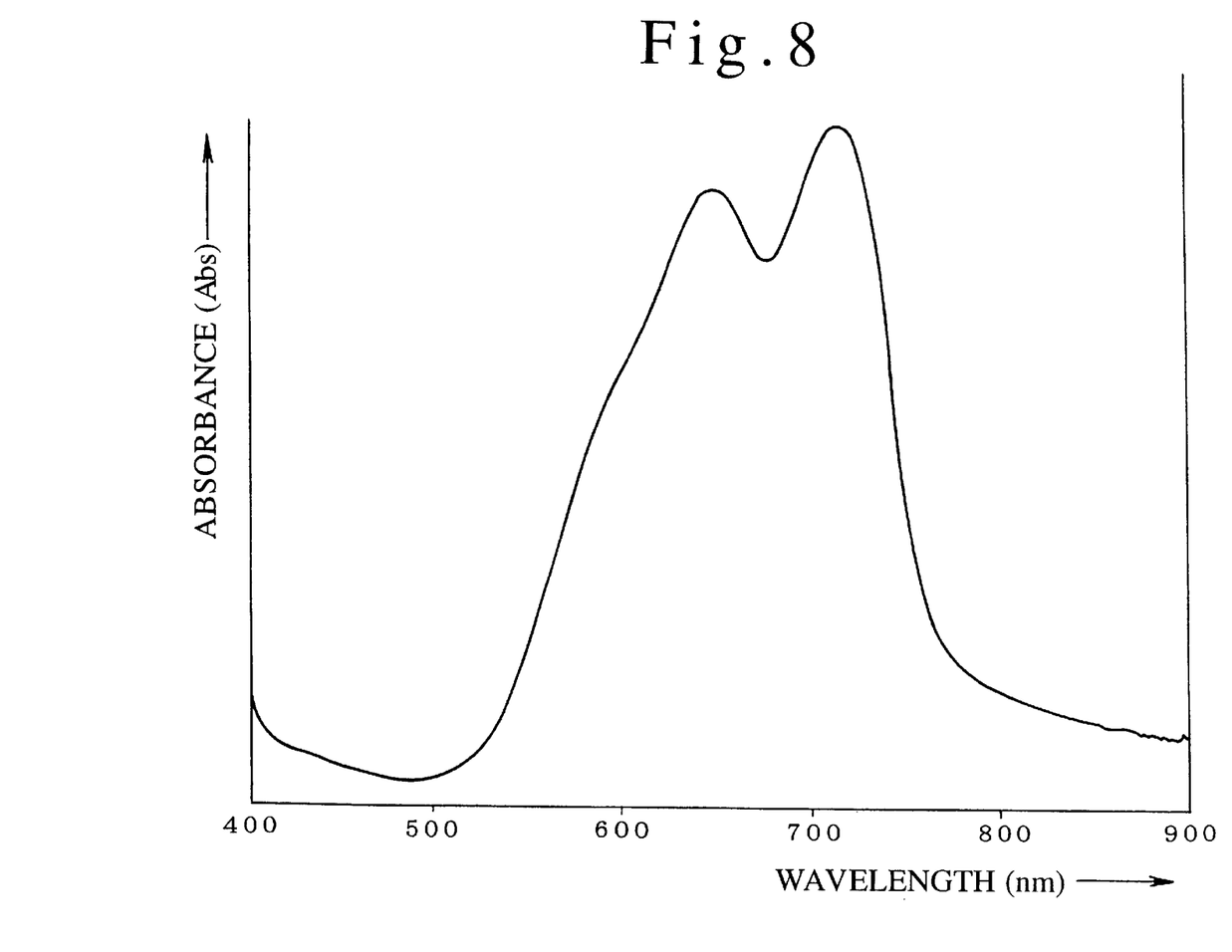
FIG. 8 is a graph of the absorbance in Practical Example 2.

Measurement of the film spectra at this time resulted in the absorption spectra given in FIG. 8.

B=0.650 Abs, and C=0.802 Abs, where B is the maximum absorbance of the short wavelength peak, and C is the maximum absorbance of the long wavelength peak.

As a result, D/B=109 nm/Abs, and D/C=88.5 nm/Abs.

Also, B/C=0.81.

The spectral wavelengths at 0.401 Abs (C/2 of the spectrum) were 604 nm and 765 nm, and the half-width H was 161 nm.

A gold (Au) light-reflecting layer 4 was formed by RF sputtering in the same manner as in Practical Example 1 on the substrate 2 with the dye film attached, and a protective layer 5 was formed using an ultraviolet-curing resin.

Recording was managed using the same recording device as in Practical Example 1 on the resulting optical data recording medium 1. The optimal recording power at this time was 12.2 mW, sufficiently lower than the maximum laser power (16 mW). The playback of the product was evaluated at a beam speed of 1.2 m/s using the same commercially available CD player as in Practical Example 1, revealing sufficiently high modulation at 75%, and good jitter values of no more than 35 ns at both pits 11 and land 7 across the entire range of 3T to 11T.

PRACTICAL EXAMPLE 3

70 parts benzoindodicarbocyanin dye having the structure shown in FIG. 4 (NK-4000, by Nihon Kanko Shikiso Kenkyujo) as the recording dye and 30 weight parts of the same aminium salt compound as in Practical Example 1 having the structure shown in FIG. 5 (IRG-003, by Nihon Kayaku) as a photostabilizer were dissolved using 20 g/L methyl Cellosolve, and the mixture was applied by spin coating onto the polycarbonate substrate 2 to form a dye film layer (light-absorbing layer 3) with a film thickness D of 85 nm.

That is, one type of dye was applied to absorb recording light.

B=0.693 Abs, and C=0.861 Abs, where B is the maximum absorbance of the short wavelength peak, and C is the maximum absorbance of the long wavelength peak.

As a result, D/B=122.7 nm/Abs, and D/C=98.7 nm/Abs.

Also, B/C=0.80.

The spectral wavelengths at 0.340 Abs (C/2 of the spectrum) were 605 nm and 757 nm, and the half-width H was 152 nm.

A gold (Au) light-reflecting layer 4 was formed by RF sputtering in the same manner as in Practical Example 1 on the substrate 2 with the dye film attached, and a protective layer 5 was formed using an ultraviolet-curing resin.

Recording was managed using the same recording device as in Practical Example 1 on the resulting optical data recording medium 1. The optimal recording power at this time was 14.5 mW, sufficiently lower than the maximum laser power (16 mW). The playback of the product was evaluated at a beam speed of 1.2 m/s using the same commercially available CD player as in Practical Example 1, revealing a modulation of 62%, which complied with the CD standard of 60%, and good jitter values of no more than 35 ns at both pits 11 and land 7 across the entire range of 3T to 11T.

Comparative Example

Figure 9:
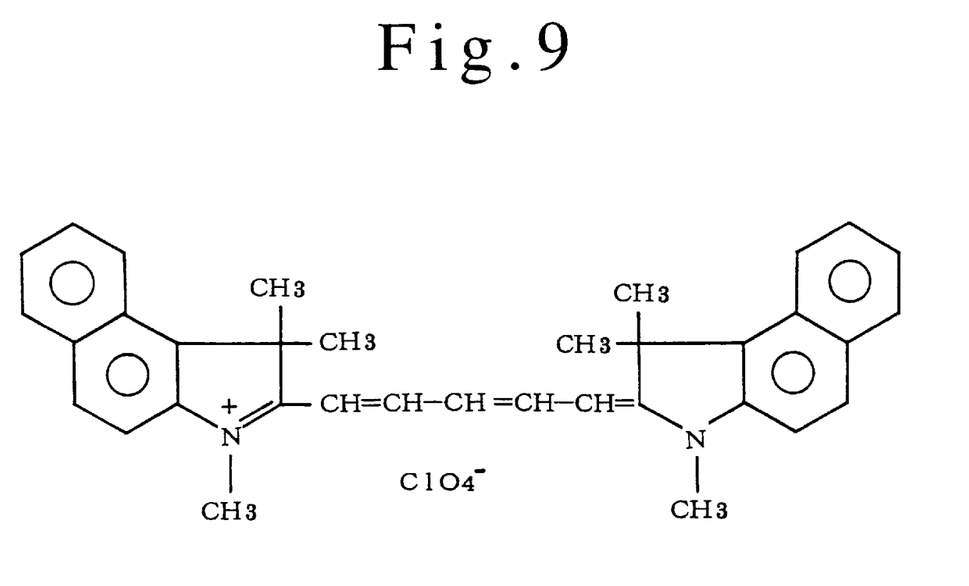
FIG. 9 shows the structural formula for another dye used in the comparative example.

An optical data recording medium was produced in the same manner as in Practical Example 1 except that the dye having the structure shown in FIG. 4 used in Practical Example 1 was replaced by a dye having the structure shown in FIG. 9, and the material was spin coated to a thickness D of 80 nm.

Figure 10:
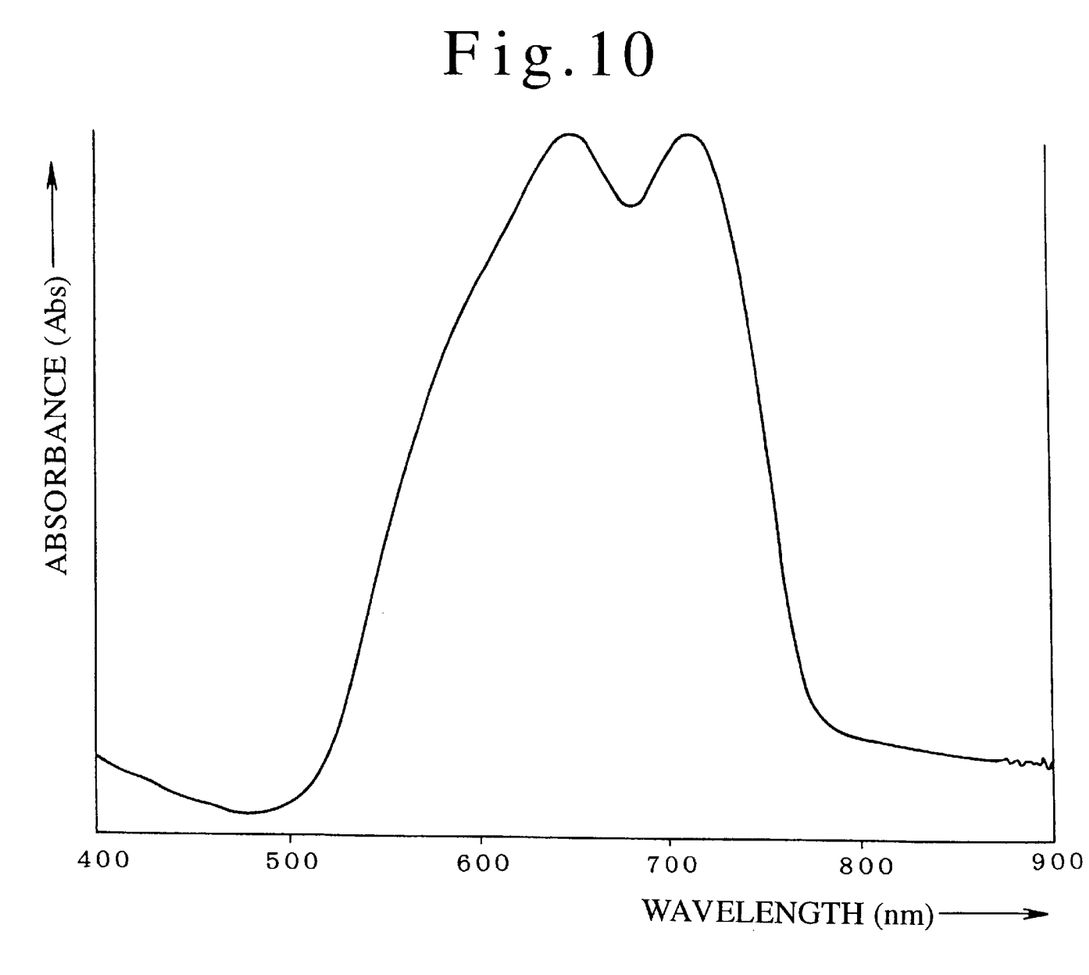
FIG. 10 is a graph of the absorbance in the comparative example.

Measurement of the spectra of this optical data recording medium resulted in the two absorption spectral peaks having virtually the same absorbance depicted in FIG. 10.

B=0.780 Abs, and C=0.775 Abs, where B is the maximum absorbance of the short wavelength peak, and C is the maximum absorbance of the long wavelength peak.

As a result, D/B=103 nm/Abs, and D/C=103 nm/Abs.

Also, B/C=1.01.

The spectral wavelengths at 0.39 Abs (C/2 of the spectrum) were 555 nm and 758 nm, and the half-width H was 203 nm.

Recording was managed using the same recording device as in Practical Example 1 on the resulting optical data recording medium 1. The recording power at this time was high at 15.0 mW. The playback of the product was evaluated at a beam speed of 1.2 m/s using the same commercially available CD player as in Practical Example 1, revealing 65% modulation, with 3T jitter of 38 ns, and high jitter of 37 ns at land 7, which exceeded the standard value of 35 ns.

PRACTICAL EXAMPLE 4

35 weight parts benzoindodicarbocyanin dye (NK-3219, by Nihon Kanko Shikiso Kenkyujo) having the structure shown in FIG. 7 used in Practical Example 2 and 45 weight parts of the dye having the structure shown in FIG. 9 used in the comparative example as the recording dye, and 20 weight parts aminium salt compound having the structure shown in FIG. 5 (IRG-003, by Nihon Kayaku) as a photostabilizer were dissolved using 20 g/L methyl Cellosolve, and the mixture was applied by spin coating onto the aforementioned substrate 2 to form a dye film layer (light-absorbing layer 3) with a film thickness D of 66 nm.

That is, two dyes were applied to absorb the recording light.

B=0.814 Abs, and C=0.825 Abs, where B is the maximum absorbance of the short wavelength peak, and C is the maximum absorbance of the long wavelength peak.

As a result, D/B=81.1 nm/Abs, and D/C=80.0 nm/Abs.

Also, B/C=0.97.

The spectral wavelengths at 0.413 Abs (C/2 of the spectrum) were 584 nm and 763 nm, and the half-width H was 179 nm.

A gold (Au) light-reflecting layer 4 was formed by RF sputtering in the same manner as in Practical Example 1 on the substrate 2 with the dye film attached, and a protective layer 5 was formed using an ultraviolet-curing resin.

Recording was managed using the same recording device as in Practical Example 1 on the resulting optical data recording medium 1. The optimal recording power at this time was 14.3 mW, sufficiently lower than the maximum laser power (16 mW). The playback of the product was evaluated at a beam speed of 1.2 m/s using the same commercially available CD player as in Practical Example 1, revealing a modulation of 65.3%, which complied with the CD standard of 60%, and good jitter values of no more than 35 ns at both pits 11 and land 7 across the entire range of 3T to 11T.

PRACTICAL EXAMPLE 5

As in Practical Example 1, 87 parts benzoindodicarbocyanin dye having the structure shown in FIG. 4 (NK-4000, by Nihon Kanko Shikiso Kenkyujo) as the recording dye and 13 weight parts aminium salt compound having the structure shown in FIG. 5 (IRG-003, by Nihon Kayaku) as a photo-stabilizer were dissolved using 16 g/L methyl Cellosolve, and the mixture was applied by spin coating onto the polycarbonate substrate 2 obtained in Practical Example 1 to form a dye film layer (light-absorbing layer 3) with a film thickness D of 58 nm.

That is, one type of dye was applied to absorb the recording light.

B=0.510 Abs, and C=0.618 Abs, where B is the maximum absorbance of the short wavelength peak, and C is the maximum absorbance of the long wavelength peak.

As a result, D/B=113.7 nm/Abs, and D/C=93.9 nm/Abs. Also, B/C=0.83.

The spectral wavelengths at 0.309 Abs (C/2 of the spectrum) were 603 nm and 760 nm, and the half-width H was 157 nm.

A gold (Au) light-reflecting layer 4 was formed by RF sputtering in the same manner as in Practical Example 1 on the substrate 2 with the dye film attached, and a protective layer 5 was formed using an ultraviolet-curing resin.

Recording was managed using the same recording device as in Practical Example 1 on the resulting optical data recording medium 1. The optimal recording power at this time was 13.4 mW, sufficiently lower than the maximum laser power (16 mW). The playback of the product was evaluated at a beam speed of 1.2 m/s using the same commercially available CD player as in Practical Example 1, revealing a modulation of 60.2%, which complied with the CD standard of 60%, and good jitter values of no more than 35 ns at both pits 11 and land 7 across the entire range of 3T to 11T.

PRACTICAL EXAMPLE 6

As in Practical Example 1, 95 parts benzoindodicarbocyanin dye having the structure shown in FIG. 4 (NK-4000, by Nihon Kanko Shikiso Kenkyujo) as the recording dye and 5 weight parts aminium salt compound having the structure shown in FIG. 5 (IRG-003, by Nihon Kayaku) as a photo-stabilizer were dissolved using 24 g/L methyl Cellosolve, and the mixture was applied by spin coating onto the polycarbonate substrate 2 obtained in Practical Example 1 to form a dye film layer (light-absorbing layer 3) with a film thickness D of 96 nm.

That is, one type of dye was applied to absorb the recording light.

B=0.886 Abs, and C=1.08 Abs, where B is the maximum absorbance of the short wavelength peak, and C is the maximum absorbance of the long wavelength peak.

As a result, D/B=108.4 nm/Abs, and D/C=88.9 nm/Abs.

Also, B/C=0.82.

The spectral wavelengths at 0.54 Abs (C/2 of the spectrum) were 605 nm and 759 nm, and the half-width H was 154 nm.

A gold (Au) light-reflecting layer 4 was formed by RF sputtering in the same manner as in Practical Example 1 on the substrate 2 with the dye film attached, and a protective layer 5 was formed using an ultraviolet-curing resin.

Recording was managed using the same recording device as in Practical Example 1 on the resulting optical data recording medium 1. The optimal recording power at this time was 12.2 mW, sufficiently lower than the maximum laser power (16 mW). The playback of the product was evaluated at a beam speed of 1.2 m/s using the same commercially available CD player as in Practical Example 1, revealing sufficiently high modulation at 85.6%, which complied with the CD standard of 60%, and good jitter values of no more than 35 ns at both pits 11 and land 7 across the entire range of 3T to 11T.

As noted above, the selection of dye absorption spectra in the manner described above in the present invention allows sufficient modulation to be obtained with a low film thickness, results in better recording sensitivity capable of withstanding high speed recording, and can reduce jitter.

What is claimed is:

1. A optical data recording medium, which comprises:

a light-transmitting substrate;

a light-absorbing layer that is located on the substrate and that contains a light-absorbing substance constructed of a dye that absorbs laser recording light; and a light-reflecting layer that is located on the light-absorbing layer and that reflects laser light, said recording light being used to irradiate said light-absorbing layer to record data;

wherein said optical data recording medium is characterized in that
   $0 < D/C \leq 100$, and
   $80 \leq D/B$.

2. An optical data recording medium according to claim 1, wherein $D/B \leq 300$.

3. An optical data recording medium according to claim 1, wherein $H \leq 180$ nm, where H is the half-width at the wavelength of the maximum absorption peak of said light-absorbing substance.

4. An optical data recording medium according to claim 1, wherein $0.6 \leq C \leq 1.1$.

5. An optical data recording medium according to claim 1, wherein said optical data recording medium is capable of absorbing said recording light at wavelengths longer than the wavelength of the maximum absorption peak of said light absorbing substance.

6. An optical data recording medium according to claim 1, wherein said light-absorbing substance includes a benzoindodicarbocyanin dye having the following structural formula:

wherein $R_1$ is (—$CH_2$)n-$CH_3$ with n being an integer from 1 to 4, $R_2$ is —$CH_3$; Y is selected from the group consisting of —$CH_3$, —Cl, —Br, and —H; and X— is selected from the group consisting of $ClO_4^-$, $BF_4^-$, $PF_6^-$, $SbF_6^-$, $CF_3COO^-$, $Cl^-$, $Br^-$, $I^-$ and $F^-$.

7. An optical data recording medium, which comprises:
a light-transmitting substrate;
a light-absorbing layer that is located on the substrate and that contains a light-absorbing substance constructed of a dye that absorbs laser recording light; and
a light-reflecting layer that is located on the light-absorbing layer and that reflects laser light, said recording light being used to irradiate said light absorbing layer to record data,
wherein said optical data recording medium is characterized in that
0<D/C≦100,
80≦D/B, and
B/C≦1.0.

8. An optical data recording medium, which comprises:
a light-transmitting substrate;
a light-absorbing layer that is located on the substrate and that contains a light-absorbing substance constructed of a dye that absorbs laser recording light; and
a light-reflecting layer that is located on the light-absorbing layer and that reflects laser light, said recording light being used to irradiate said light-absorbing layer to record data,
wherein said optical data recording medium is characterized in that
0<D/C≦100,
80≦D/B,
H<180 nm, and
B/C≦1.0.

* * * * *